United States Patent
Tanaka

(10) Patent No.: US 10,895,529 B2
(45) Date of Patent: Jan. 19, 2021

(54) DETECTING SYSTEM AND DETECTING METHOD

(71) Applicant: NEC Corporation, Tokyo (JP)

(72) Inventor: Akihiro Tanaka, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/478,508

(22) PCT Filed: Jan. 22, 2018

(86) PCT No.: PCT/JP2018/001831
§ 371 (c)(1),
(2) Date: Jul. 17, 2019

(87) PCT Pub. No.: WO2018/139412
PCT Pub. Date: Aug. 2, 2018

(65) Prior Publication Data
US 2019/0391073 A1  Dec. 26, 2019

(30) Foreign Application Priority Data
Jan. 26, 2017  (JP) .................................. 2017-012455

(51) Int. Cl.
*G01N 21/3504* (2014.01)
*G01N 21/27* (2006.01)
(Continued)

(52) U.S. Cl.
CPC ............ *G01N 21/3504* (2013.01); *G01J 3/26* (2013.01); *G01N 21/27* (2013.01);
(Continued)

(58) Field of Classification Search
CPC ............... G01N 21/3504; G01N 21/15; G01N 21/3151; G01N 21/274; G01N 21/27;
(Continued)

(56) References Cited

U.S. PATENT DOCUMENTS

| 5,306,913 A | 4/1994 | Noack et al. |
| 5,790,259 A * | 8/1998 | Mizuhata ............... G01N 21/55 356/369 |

(Continued)

FOREIGN PATENT DOCUMENTS

| JP | H07-280951 A | 10/1995 |
| JP | 2006-053116 A | 2/2006 |

(Continued)

OTHER PUBLICATIONS

International Search Report for PCT Application No. PCT/JP2018/001831, dated Apr. 3, 2018.

(Continued)

*Primary Examiner* — Sang H Nguyen

(57) ABSTRACT

In order to distinguish between a deterioration in a received optical signal strength resulting from optical axis deviation, and a deterioration in the received optical signal strength due to the effects of dust and the like, this detecting system is provided with: a transmitter provided with a light emitting unit for transmitting a first optical signal and a second optical signal having mutually different wavelengths and divergence angles; and a receiver provided with a detecting unit for receiving the first and second optical signals and outputting a first reception signal indicating the reception strength of the first optical signal, and a second reception signal indicating the reception strength of the second optical signal, and an identification unit for determining a state of propagation of the first and second optical signals on the basis of an amount of variation in the first and second reception signals.

14 Claims, 10 Drawing Sheets

(51) Int. Cl.
*G01N 21/31* (2006.01)
*G01J 3/26* (2006.01)
*H04B 10/116* (2013.01)

(52) U.S. Cl.
CPC ....... *G01N 21/3151* (2013.01); *H04B 10/116* (2013.01); *G01N 2021/3133* (2013.01)

(58) Field of Classification Search
CPC .... G01N 2021/3133; G01J 3/027; G01J 3/42; G01J 3/26; H04B 10/116; H04B 10/114
See application file for complete search history.

(56) References Cited

U.S. PATENT DOCUMENTS

| | | | | |
|---|---|---|---|---|
| 6,538,728 | B1* | 3/2003 | Stolle | G01N 21/31 356/437 |
| 9,030,663 | B2* | 5/2015 | Braun | G01N 21/3504 356/432 |
| 2006/0062099 | A1 | 3/2006 | Yazaki et al. | |
| 2006/0098202 | A1 | 5/2006 | Willing et al. | |
| 2008/0074647 | A1 | 3/2008 | Doring et al. | |
| 2010/0053621 | A1* | 3/2010 | Olson | G01N 21/31 356/437 |
| 2013/0027700 | A1* | 1/2013 | Youngner | G01J 3/1804 356/310 |
| 2015/0099274 | A1* | 4/2015 | Axelrod | C12M 41/46 435/39 |
| 2015/0355082 | A1* | 12/2015 | Lu | G01N 21/3504 356/437 |
| 2016/0054294 | A1* | 2/2016 | Rihani | G01N 21/05 73/23.3 |
| 2016/0231244 | A1* | 8/2016 | Camargo | G01N 21/61 |
| 2017/0336320 | A1* | 11/2017 | Yalin | G01N 21/3504 |
| 2018/0284088 | A1* | 10/2018 | Verbeck, IV | G01N 1/26 |

FOREIGN PATENT DOCUMENTS

| | | |
|---|---|---|
| JP | 2006-067333 A | 3/2006 |
| JP | 2007-504449 A | 3/2007 |
| JP | 2007-228464 A | 9/2007 |

OTHER PUBLICATIONS

English translation of Written opinion for PCT Application No. PCT/JP2018/001831.

* cited by examiner

DETECTING SYSTEM AND DETECTING METHOD

This application is a National Stage Entry of PCT/JP2018/001831 filed on Jan. 22, 2018, which claims priority from Japanese Patent Application 2017-012455 filed on Jan. 26, 2017, the contents of all of which are incorporated herein by reference, in their entirety.

TECHNICAL FIELD

The present invention relates to a detecting system and a detecting method that are used in an optical gas detecting system for measuring a plurality of surrounding gas concentrations by propagating an optical signal through free space.

BACKGROUND ART

In recent years, as a result of advancement of urbanization in the countries over the world, it is becoming difficult to secure a land for developing a new infrastructure. Thus, in order to make efficient use of urban space, approaches to install underground facilities are promoted for the facilities that do not necessarily need to be located on a ground surface.

In particular, use of underground space for a motorway is promoted, and a ratio of length of a tunnel section accounting for length of a motorway in an urban area is increasing. Then, a tunnel of a motorway needs large-scale ventilation equipment for handling exhaust gas from automobiles.

An atmosphere is monitored in ventilation equipment installed in a tunnel of a motorway by using a suction-measuring instrument for collecting surrounding air. This suction measuring instrument includes a suction pump being a movable component and thus has frequent faults. Since the suction measuring instrument operates in dusty environment in the tunnel, an overhaul is needed every half year, which causes an increase in maintenance cost. Thus, there is an increasing demand for ventilation equipment using an atmosphere observation means having a small maintenance load in order to operate a motorway tunnel efficiently that continues to increase.

FIG. 12 is a schematic diagram of an optical gas detecting system. In the example of FIG. 12, optical signals from two light sources are used, and gas detection of various kinds is performed. A transmitter 91 converts optical signals output from light sources 911 and 912 into subparallel light beams by condensers 913 and 914, and transmits the converted optical signals to a receiver 92. The light sources 911 and 912 are controlled by drivers 916 and 917.

The receiver 92 condenses the received optical signals by condensers 921 and 922, converts the received optical signals into electric signals by detectors 923 and 924, and performs predetermined signal processing by a signal processing unit 925. The receiver 92 calculates an average concentration of a measuring target gas present between the transmitter 91 and the receiver 92 by the signal processing.

As a method of detecting a concentration of gas, there is known a method of using the property of a gas molecule that absorbs light with a specific wavelength, and performing gas detection while modulating a wavelength by using a narrow-wavelength band light source that outputs a wavelength near an absorption wavelength. Furthermore, there is also known a method of calculating a gas concentration from known spectral intensity by using a broad-wavelength band light source that widely covers an absorption wavelength. An example of the former method is a wavelength modulation spectroscopy (WMS) method, and an example of the latter is a differential optical absorption spectroscopy (DOAS) method. Further, PTL 1 describes an optical radio transmission device using a plurality of light beams.

FIG. 13 is a schematic diagram of a general acquisition and tracking technique used in an optical space communication system. A half mirror 104 branches a light beam radiated from a transmitter 101 to a detector 102. A detector 106 receives the light branched by the half mirror 104, and detects an optical axis deviation of the light beam as fluctuations in light receiving focal position. The detector 106 detects the fluctuations in light receiving focal position as an amount of optical axis deviation by using a quadrant photodetector 107, and amplifiers 108 and 109. An identifier 105 controls an angle of a mirror 103, based on the detected amount of optical axis deviation.

CITATION LIST

Patent Literature

[PTL 1] Japanese Unexamined Patent Application Publication No. 2007-228464

SUMMARY OF INVENTION

Technical Problem

When a gas concentration state in a surrounding atmosphere is measured by a gas detecting method using light, there is a risk that long-term stability of a gas detecting function deteriorates due to various factors. Examples include long-term deterioration of strength of an optical signal output from a light source, a decrease in intensity of received light due to an increase in moisture and dust in an atmosphere, a decrease in received optical signal strength due to a deviation of an optical axis between a transmitter and a receiver, and the like.

Fluctuations in optical signal strength of a light source can be detected inside a device. However, the other two factors depend on an external environment, and thus detection and compensation of the other two factors inside the device are difficult. In particular, when a distance between a transmitter and a receiver is great, an optical axis deviation between the transmitter and the receiver has a great influence on a detection result of gas.

PTL 1 describes a method of capturing an optical axis by causing beacon light having a wide emission angle for an optical axis adjustment to travel in parallel with signal light. Further, the technique described with FIG. 13 can also detect an optical axis deviation and control an optical axis.

However, while these methods can detect occurrence of an optical axis deviation, the methods cannot distinguish between a decrease in received optical signal strength due to an increase in dust and the like and a decrease in received optical signal strength due to an optical axis deviation. Thus, a decrease in optical signal strength due to an increase in dust and the like may be mistakenly recognized as a decrease in received optical signal strength due to an optical axis deviation. In this case, an optical axis is controlled in a wrong direction, and thus, there is a problem that an optical signal cannot be detected.

Object of Invention

An object of the invention of the present application is to provide a technique for distinguishing between a decrease in received optical signal strength due to an optical axis deviation and a decrease in received optical signal strength due to an influence of dust and the like, in a gas detecting system for measuring a gas concentration by propagating an optical signal.

Solution to Problem

A detecting system of the present invention comprises: a transmitter that includes light emitting means for transmitting a first optical signal and a second optical signal having wavelengths and spread angles different from each other; and a receiver that includes detecting means for receiving the first optical signal and the second optical signal, and outputting a first reception signal indicating reception strength of the first optical signal and a second reception signal indicating reception strength of the second optical signal, and identification means for determining a propagation state of the first optical signal and the second optical signal, based on an amount of change in the first reception signal and the second reception signal.

A detecting method of the present invention comprises the following features: transmitting a first optical signal and a second optical signal having wavelengths and spread angles different from each other; receiving the first optical signal and the second optical signal; outputting a first reception signal indicating reception strength of the first optical signal and a second reception signal indicating reception strength of the second optical signal; and determining a propagation state of the first optical signal and the second optical signal, based on an amount of change in the first reception signal and the second reception signal.

Advantageous Effects of Invention

A detecting system of the present invention enables to distinguish between a decrease in received optical signal strength due to an optical axis deviation and a decrease in received optical signal strength due to an influence of dust and the like.

EXAMPLE EMBODIMENT

First Example Embodiment

Figure 1:
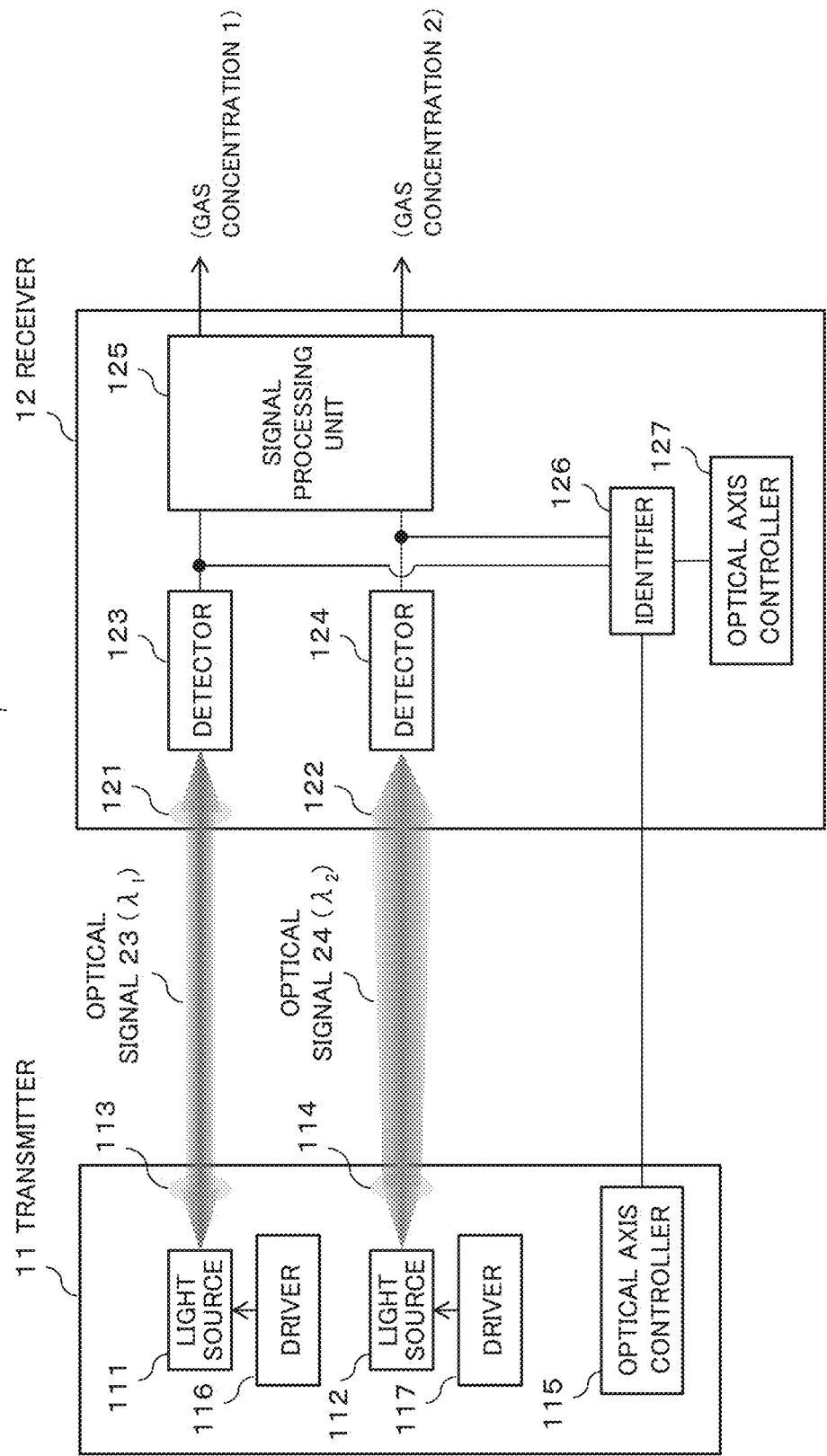
FIG. 1 is a block diagram illustrating a configuration example of a gas detecting system 1 in a first example embodiment.

A first example embodiment of the present invention is described with reference to drawings. FIG. 1 is a block diagram illustrating a configuration example of a gas detecting system 1 in the first example embodiment. The gas detecting system 1 includes a transmitter 11 and a receiver 12. The transmitter 11 propagates optical signals 23 and 24 between the transmitter 11 and the receiver 12, and measures a gas concentration in a space between these.

The transmitter 11 includes two light sources 111 and 112, two condensers 113 and 114, an optical axis controller 115, and drivers 116 and 117. The receiver 12 includes two condensers 121 and 122, two detectors 123 and 124, a signal processing unit 125, an identifier 126, and an optical axis controller 127. The light sources 111 and 112 are laser light sources, and the drivers 116 and 117 are electric circuits that drive the light sources 111 and 112. The condensers 113, 114, 121, and 122 are optical lenses. The detectors 123 and 124 are photoelectric converters such as photodetectors. Further, a wavelength $\lambda_1$ of the optical signal 23 output from the light source 111 is shorter than a wavelength $\lambda_2$ of the optical signal 24 output from the light source 112. In other words, $\lambda_1 < \lambda_2$.

The signal processing unit 125 calculates a gas concentration, based on electric signals indicating strength of the optical signals 23 and 24 input from the detectors 123 and 124. The signal processing unit 125 is an electric circuit, and may be a digital signal processor (DSP). The signal processing unit 125 acquires a gas concentration 1 between the transmitter 11 and the receiver 12, based on the electric signal indicating the strength of the optical signal 23, and acquires a gas concentration 2 between the transmitter 11 and the receiver 12, based on the electric signal indicating the strength of the optical signal 24. The optical signals 23 and 24 have different wavelengths, and thus the gas concentration 1 and the gas concentration 2 indicate concentrations of different kinds of gas. There is known a technique for calculating a gas concentration based on strength of a signal receiving an optical signal with a specific wavelength, and thus description of a calculation procedure of a gas concentration is omitted herein.

The identifier 126 is an electric circuit. The identifier 126 determines a cause for a change in strength of the optical signals 23 and 24, based on the electric signals indicating the strength of the optical signals 23 and 24, and outputs signals indicating results thereof to the optical axis controllers 115 and 127. The optical axis controllers 115 and 127 adjust an optical axis between the light source 111 and the detector 123 and an optical axis between the optical axis 112 and the detector 124, based on the signals input from the identifier 126.

Figure 2:
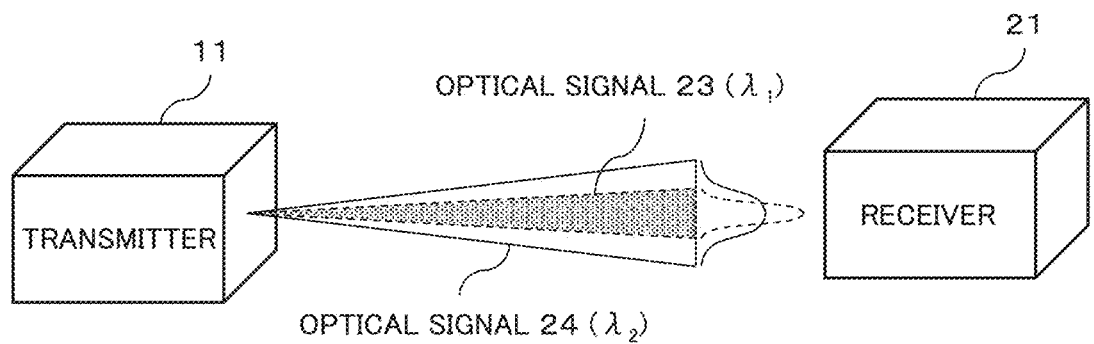
FIG. 2 is a schematic diagram illustrating an example of optical signals having two different spread angles in the first example embodiment.

FIG. 2 is a schematic diagram illustrating a relative difference in spread angles between the two optical signals 23 and 24 in the first example embodiment. A spread angle of the optical signal 23 that is output from the light source 111 and received by the detector 123 is narrower than that of the optical signal 24 that is output from the light source 112 and received by the detector 124. FIG. 2 illustrates that both of the optical signals 23 and 24 are condensed at the center of light receiving surfaces of the detectors 123 and 124.

Operation in First Example Embodiment

The optical signal with the wavelength $\lambda_1$ output from the light source 111, a drive current and a temperature of the light source 111 being controlled by the driver 116, is converted into a subparallel light beam (optical signal 23) by the condenser 113, propagates through the air, and is received by the receiver 12. The optical signal 23 is condensed by the condenser 121 and is photoelectrically converted by the detector 123. The signal processing unit 125 calculates an average value of a concentration of carbon dioxide ($CO_2$) between the transmitter 11 and the receiver 12 by processing the electric signal acquired herein.

The optical signal with the wavelength $\lambda_2$ output from the light source 112, a drive current and a temperature of which are controlled by the driver 117, is converted into a subparallel light beam (optical signal 24) by the condenser 114, propagates through the air, and is received by the receiver 12. The optical signal 24 is condensed by the condenser 122 and is photoelectrically converted by the detector 124. The signal processing unit 125 calculates an average value of a concentration of carbon monoxide (CO) between the transmitter 11 and the receiver 12 by processing the electric signal acquired herein.

Figure 3:
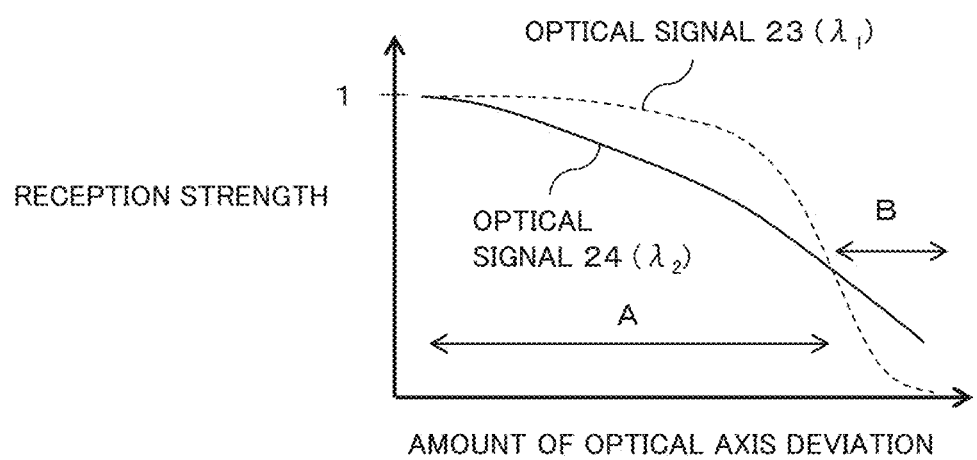
FIG. 3 is a schematic diagram illustrating a first example of a change in reception strength of the two optical signals in the first example embodiment.

An operation when an optical axis is deviated between the transmitter 11 and the receiver 12 is described by using FIG. 3. FIG. 3 is a schematic diagram illustrating a first example of a change in reception strength of the optical signals 23 and 24 in the first example embodiment. FIG. 3 illustrates an example of the change in the reception strength of the optical signals 23 and 24 with respect to an amount of optical axis deviation. In FIG. 3, the reception strength is standardized. As illustrated in FIG. 2, a spread angle of the optical signal 23 output from the light source 111 is set to be narrower than a spread angle of the optical signal 24 output from the light source 112.

Thus, the reception strength of the optical signal 24 output from the light source 112 gradually decreases in a region (A in FIG. 3) having a relatively small deviation amount of an optical axis, whereas the reception strength of the optical signal 23 output from the light source 111 hardly changes at the beginning. Such a characteristic is acquired under a condition that a size of the light receiving surface of the detector 123 is greater than a spot size of the optical signal 23 after condensation in the condenser 121.

On the other hand, the reception strength of the optical signal 23 output from the light source 111 abruptly decreases with an increase in the amount of optical axis deviation in a region (B in FIG. 3) having a great deviation amount of the optical axis. The reason is that the spot size of the optical signal 23 after the condensation in the condenser 121 is small, and thus the optical signal 23 cannot be received by the light receiving surface of the detector 123 when the amount of optical axis deviation is increased to some extent.

On the other hand, a spot size after the optical signal 24 output from the light source 112 is condensed by the condenser 122 is relatively great, and thus a part of the optical signal 24 is received by the light receiving surface of the detector 124 even when the amount of optical axis deviation is increased to some extent. Thus, a decrease in the reception strength of the optical signal 24 is gentle even in the region of B in FIG. 3.

Figure 4:
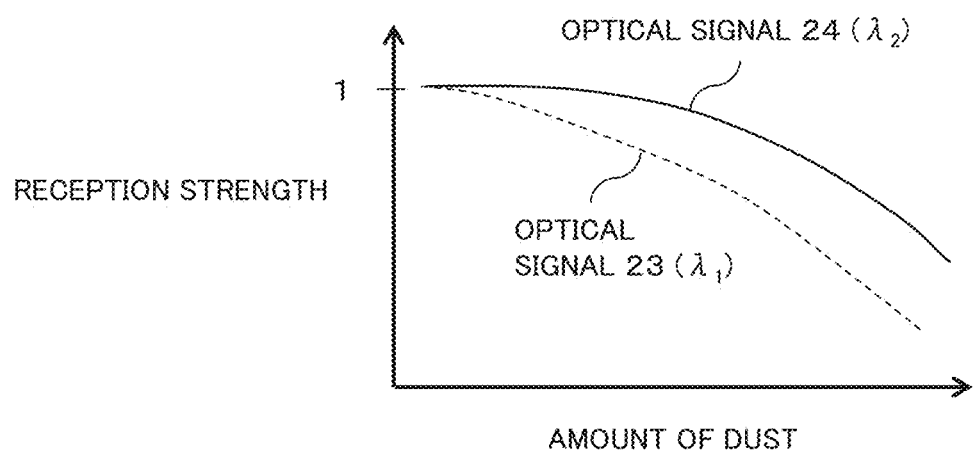
FIG. 4 is a schematic diagram illustrating a second example of a change in reception strength of the two optical signals in the first example embodiment.

An operation when dust present in the space between the transmitter 11 and the receiver 12 increases is described by using FIG. 4. FIG. 4 is a schematic diagram illustrating a second example of a change in reception strength of the optical signals 23 and 24 in the first example embodiment. FIG. 4 illustrates an example of the change in the reception strength of the two optical signals with respect to a change in amount of dust. In FIG. 4, the reception strength is normalized.

In general, when a size of a particle such as dust is smaller than a wavelength of an optical signal, a scattering coefficient k of light with a wavelength $\lambda$ is given by the following equation according to Rayleigh scattering.

$$k = \frac{2\pi^5}{3} n \left( \frac{m^2 - 1}{m^2 + 2} \right) \frac{d^6}{\lambda^4}$$

Herein, n is the number of particles, m is a reflection coefficient, and d is a particle size. In other words, a size of scattering is proportional to the amount n of dust and is inversely proportional to fourth power of the wavelength $\lambda$ of the optical signal. In the present example embodiment, the wavelength $\lambda_2$ of the optical signal 24 is longer than the wavelength $\lambda_1$ of the optical signal 23. Therefore, the optical signal 23 has a greater scattering coefficient with respect to dust than that of the optical signal 24, and thus the optical signal 23 has a greater decrease amount of reception strength with respect to the amount of dust, and the relationship illustrated in FIG. 4 is acquired.

It is clear from FIGS. 3 and 4 that the changes in the reception strength of the optical signals 23 and 24 due to the optical axis deviation between the transmitter 11 and the receiver 12, and the increase in dust present in the space are different from each other. Therefore, distinction of causes for the change in the received optical signal strength based on a flowchart illustrated in FIG. 5 can be achieved.

Figure 5:
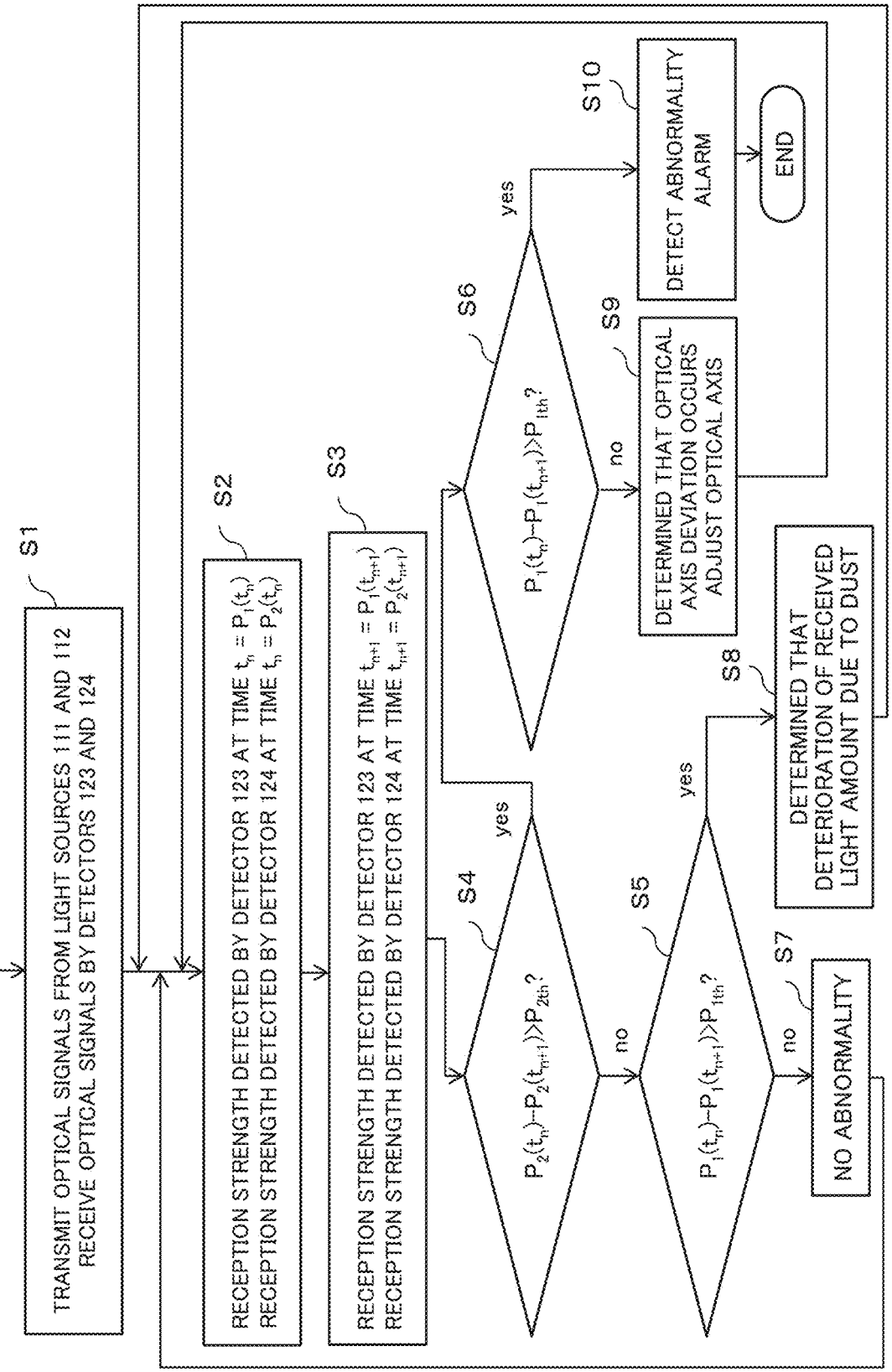
FIG. 5 is a flowchart illustrating an example of a control procedure of the gas detecting system in the first example embodiment.

FIG. 5 is a flowchart illustrating an example of a control procedure of the gas detecting system in the first example embodiment. The transmitter 11 transmits the optical signals 23 and 24 from the light sources 111 and 112, and the receiver 12 receives the optical signals 23 and 24 by the detectors 123 and 124 (Step S1 in FIG. 5).

It is assumed that, at a time $t_n$, reception strength of the optical signal 23 detected by the detector 123 is $P_1(t_n)$, and reception strength of the optical signal 24 detected by the detector 124 is $P_2(t_n)$ (Step S2).

Next, it is assumed that, at a time $t_{n+1}$ after the time $t_n$, reception strength of the optical signal 23 detected by the detector 123 is $P_1(t_{n+1})$, and reception strength of the optical signal 24 detected by the detector 124 is $P_2(t_{n+1})$ (Step S3). Then, the identifier 126 compares changes in $P_1$ and $P_2$ between the time $t_n$ and the time $t_{n+1}$ with threshold values (Steps S4 to S6), and determines a state of the gas detecting system 1 (Steps S7 to S10).

When a decrease amount of $P_2$ is less than or equal to a predetermined threshold value $P_{2th}$ (Step S4: no) and a decrease amount of $P_1$ is also less than or equal to a predetermined threshold value $P_{1th}$ (Step S5: no), it is determined that there is no abnormality because the change is small (Step S7).

When the decrease amount of $P_2$ is less than or equal to the threshold value $P_{2th}$ (Step S4: no) and the decrease amount of $P_1$ exceeds the threshold value $P_{1th}$ (Step S5: yes), it is determined that the reception strength decreases due to dust because a decrease in the reception strength of only the optical signal 23 with the wavelength λ1 is great (Step S8).

When the decrease amount of $P_2$ exceeds the threshold value $P_{2th}$ (Step S4: yes) and the decrease amount of $P_1$ is less than or equal to the threshold value $P_{1th}$ (Step S6: no), it is determined that there is an optical axis deviation because a decrease in the reception strength of only the optical signal 24 with the wavelength λ2 is great (Step S9).

When the decrease amount of $P_2$ exceeds the threshold value $P_{2th}$ (Step S4: yes) and the decrease amount of $P_1$ also exceeds the threshold value $P_{1th}$ (Step S6: yes), it is determined that an abnormality is detected and an alarm is issued (Step S10).

A measurement of a gas concentration continues when it is determined that there is no abnormality (Step S7), based on the flow described above, and a measurement of a gas concentration also continues when it is determined that dust has an influence (Step S8). This is to wait for a surrounding environment to be improved since the amount of dust between the transmitter 11 and the receiver 12 changes by the surrounding environment. Also, this is to avoid performing unnecessary optical axis adjustment in a state where strength of an optical signal to be received is decreased due to an influence of dust. On the other hand, when it is determined that there is an optical axis deviation (Step S9), the identifier 126 instructs the optical axis controllers 115 and 127 to readjust an optical axis, and restores strength of an optical signal to be received. When it is determined that an abnormality is detected (Step S10), a measurement is discontinued as necessary.

Effect of First Example Embodiment

The gas detecting system 1 in the first example embodiment can distinguish causes for a decrease in received optical signal strength into a decrease due to an optical axis deviation and a decrease due to an influence of dust and the like. The reason for this is that a change in the received optical signal strength is acquired by using optical signals with different wavelengths and spread angles.

Then, the gas detecting system in the present example embodiment can achieve long-term stable operation. The reason for this is that treatment according to cause can be achieved by distinguishing causes for a decrease in received optical signal strength into a decrease due to an optical axis deviation and a decrease due to an influence of dust and the like.

Modification Example of First Example Embodiment

In the first example embodiment, laser light sources are used as the two light sources 111 and 112, but broadband light sources such as light emitting diodes (LEDs) and super luminescent diodes (SLDs) may be used. Accordingly, a gas concentration may be measured by a differential optical absorption spectroscopy method.

An optical amplifier may be inserted in an output stage of the light sources 111 and 112, and an input stage of the detectors 123 and 124. By using the optical amplifier, a signal-to-noise ratio of an optical signal to be received can be improved, and accuracy of a detection result of gas can be increased.

When an optical signal spatially propagates from the transmitter 11 to the receiver 12, a spatial propagation path may be lengthened by reflecting the optical signal for more than once by using one or more mirrors. A gas having a lower concentration can be detected by lengthening the propagation path.

The first example embodiment provides the example in which the transmitter 11 includes the optical axis controller 115, the receiver 12 includes the optical axis controller, and these optical axis controllers make an optical axis adjustment, based on control from the identifier 126. However, an optical axis adjustment may be manually performed.

FIG. 5 illustrates the example of the procedure for comparing strength changes of the optical signals 23 and 24 at the two different times, but a simpler flow may be applied. For example, the receiver 12 may store reception strength of each optical signal during a normal operation as a reference value, and a deterioration factor may be determined by detecting a decrease in the reception strength of any of the optical signals 23 and 24 from this reference value.

Furthermore, the present example embodiment provides the example in which detection of carbon monoxide and carbon dioxide is performed, but the gas detecting system 1 may include a configuration in which an absorption spectrum of still another gas molecule is monitored at a different wavelength. The present example embodiment is generally applicable to a system for detecting a plurality of gas molecules by using optical signals with a plurality of wavelengths.

Figure 11:
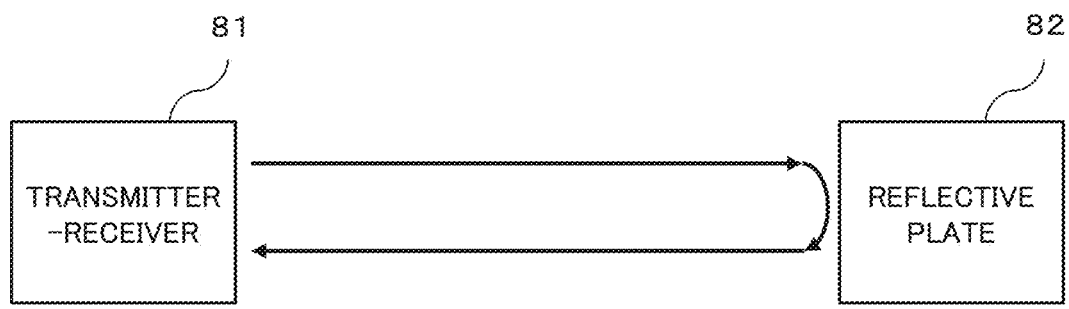
FIG. 11 is a schematic diagram illustrating an example of a configuration that simplifies the configurations of the first and second example embodiments.
Figure 12:
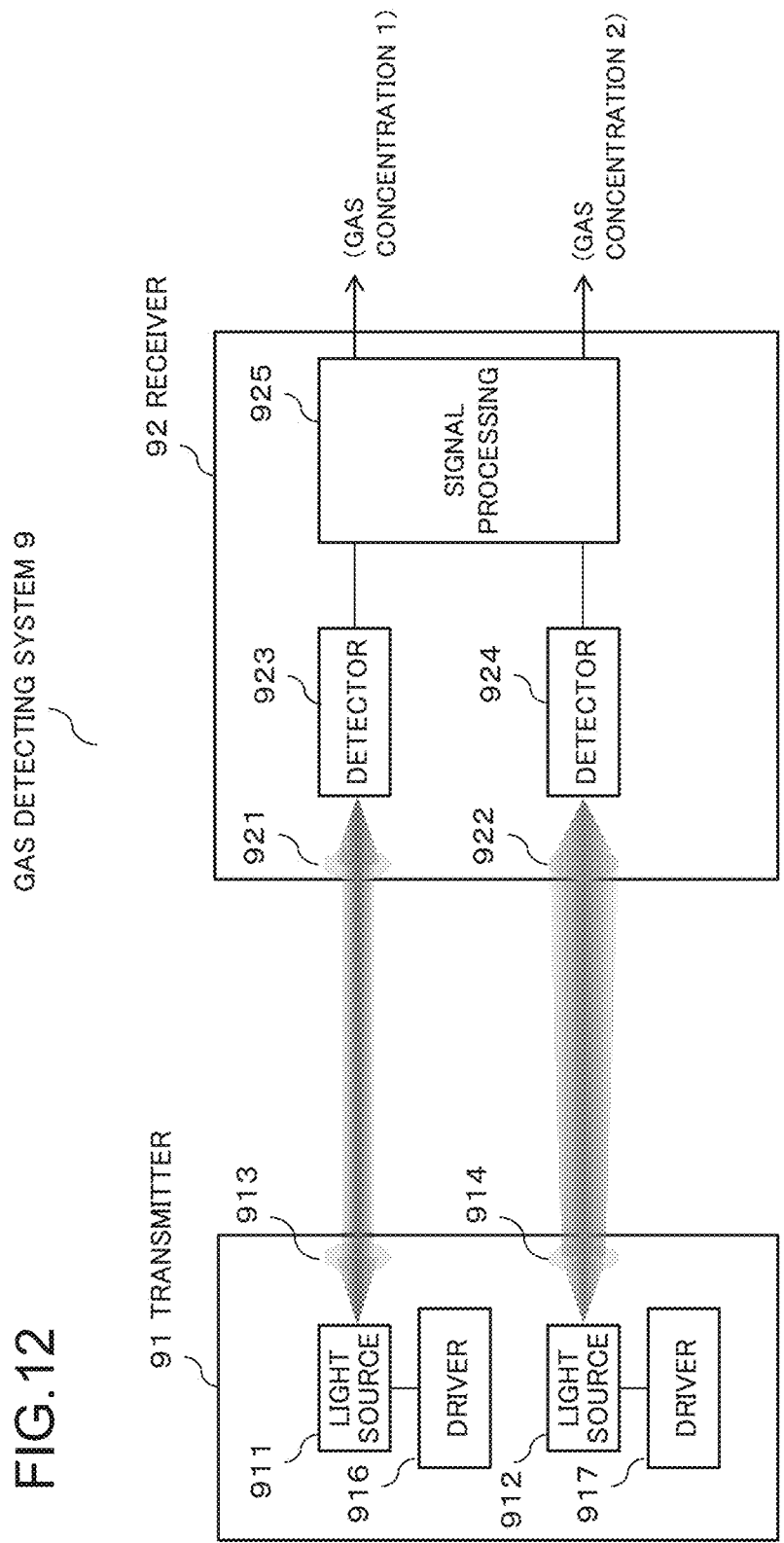
FIG. 12 is a schematic diagram of a general optical gas detecting system.
Figure 13:
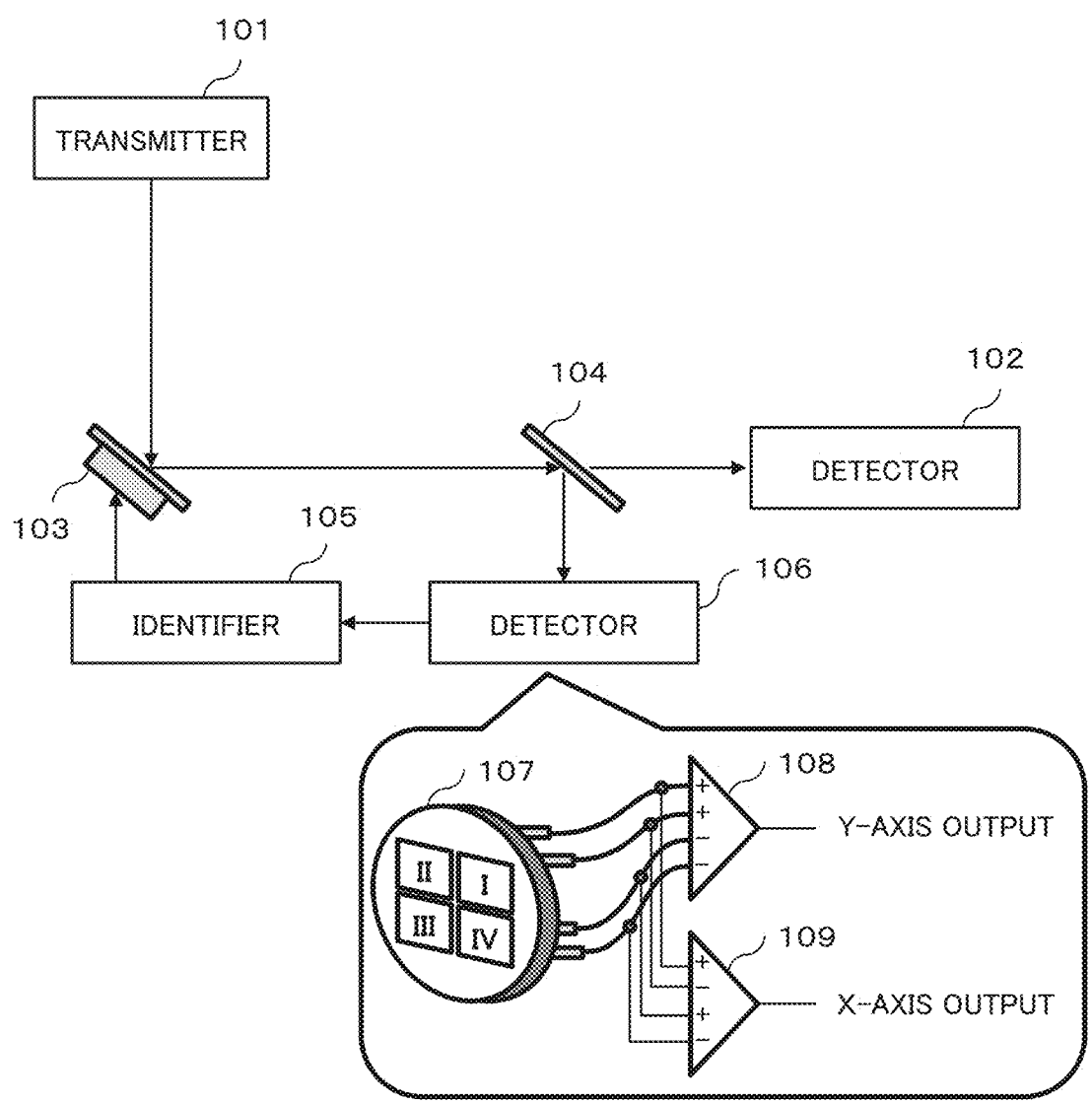
FIG. 13 is a schematic diagram of an acquisition and tracking technique used in an optical space communication system.

Further, the present example embodiment provides the example in which an optical signal propagates between the transmitter 11 and the receiver 12. However, as illustrated in FIG. 11, it is also possible to have a configuration in which a transmitter-receiver 81, formed by integrating the transmitter 11 and the receiver 12, and a reflective plate 82 are used. A corner cube reflector can be used as the reflective plate 82. This configuration reduces an influence of an optical axis deviation and simplifies an optical axis readjustment, and also enables to set one end of a propagation path of an optical signal to non-power supply.

Second Example Embodiment

In the first example embodiment, when reception strength of the optical signals 23 and 24 decrease, a cause therefor is separated into an optical axis deviation and an increase in dust, by using the two optical signals 23 and 24 having different radiation spread angles. A second example embodiment indicates that, in addition to an optical axis deviation and an increase in dust, information related to a direction of an optical axis deviation is acquired as a cause for a decrease in reception strength of an optical signal by using three optical signals.

Figure 6:
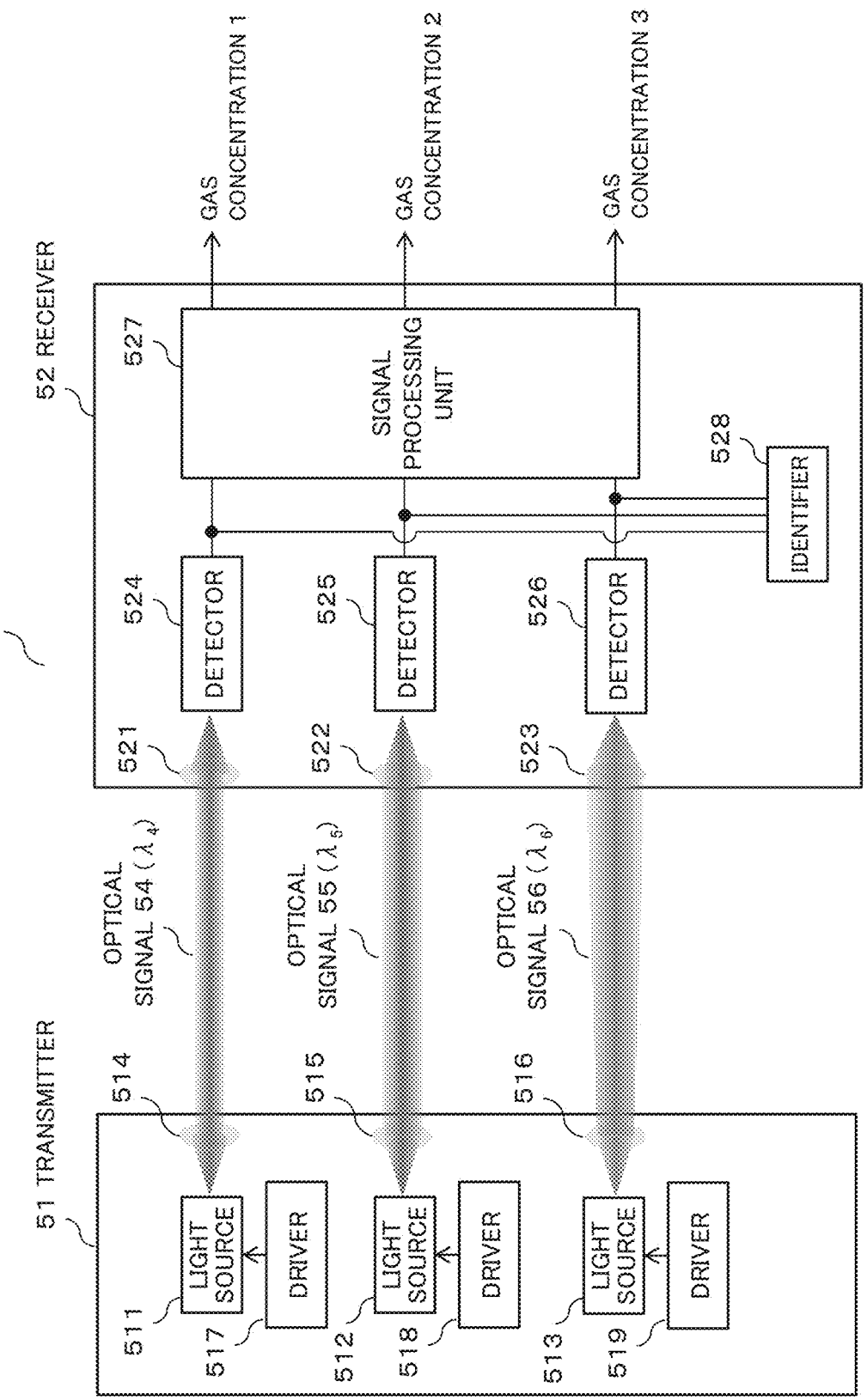
FIG. 6 is a block diagram illustrating a configuration example of a gas detecting system 2 in a second example embodiment.

FIG. 6 is a block diagram illustrating a configuration example of a gas detecting system 2 in the second example embodiment. The gas detecting system 2 includes a transmitter 51 and a receiver 52. The transmitter 51 propagates optical signals 54 to 56 between the transmitter 51 and the receiver 12, and measures a gas concentration in a space between these. The transmitter 51 includes three light sources 511 to 513, three condensers 514 to 516, and three drivers 517 to 519. The receiver 52 includes three condensers 521 to 523, three detectors 524 to 526, a signal processing unit 527, and an identifier 528. The light sources 511 to 513 are laser light sources, and the drivers 517 to 519 are electric circuits that drive the light sources 511 to 513. The condensers 514 to 516 and 521 to 523 are optical lenses. The detectors 524 to 526 are photodetectors.

A wavelength $\lambda_4$ of the optical signal 54 output from the light source 511 is the shortest wavelength. A wavelength $\lambda_5$ of the optical signal 55 output from the light source 512 is the next shortest. A wavelength $\lambda_6$ of the optical signal 56 output from the light source 513 is the longest wavelength. In other words, $\lambda_4<\lambda_5<\lambda_6$. Note that the gas detecting system 2 also includes an optical axis controller similar to that in the gas detecting system 1, but description of blocks corresponding to the optical axis controllers 115 and 127 described in FIG. 1 is omitted from FIG. 6.

The signal processing unit 527 calculates gas concentrations 1 to 3, based on reception strength of the optical signals 54 to 56. This procedure is already known similarly to that in the first example embodiment, and thus description of the calculation procedure of a gas concentration is omitted herein.

Figure 7:
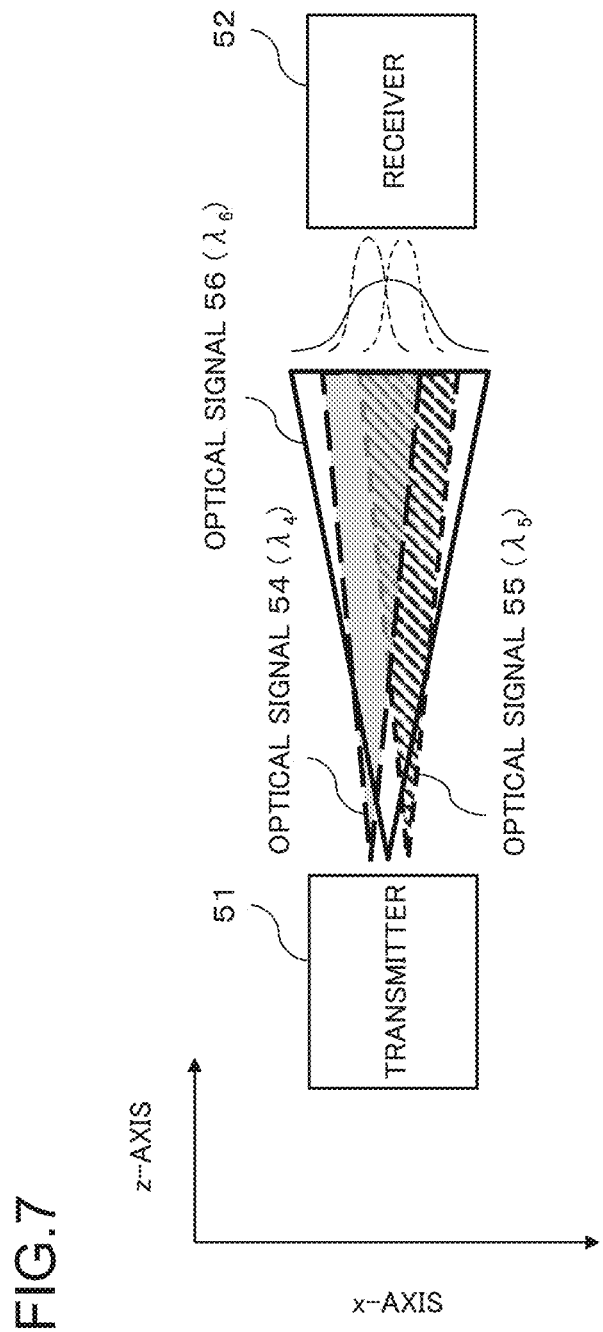
FIG. 7 is a schematic diagram illustrating a difference in spread angles among three optical signals in the second example embodiment and a relative difference in light emission positions and condensation positions.

FIG. 7 is a schematic diagram in which a relative difference in spread angles among the three optical signals 54 to 56 in the second example embodiment and a relative difference in light emission positions and condensation positions are superimposed on each other and displayed. A spread angle of the optical signals 54 and 55 is narrower than that of the optical signal 56.

FIG. 7 is the schematic diagram illustrating an example of the difference in spread angles among the three optical signals and the difference in light emission positions and condensation positions in the second example embodiment. As illustrated in FIG. 7, light emission positions and condensation positions of the three optical signals 54 to 56 are shifted each other on an x-axis. The x-axis is a top and bottom direction on the page at right angles to a propagation direction of the optical signals 54 to 56.

FIG. 7 illustrates a deviation of positions on the x-axis at which the optical signals 54 to 56 are made incident on light receiving surfaces of the detectors 524 to 526 installed in the receiver 52. Positions of the light source 511 and the condensers 514 and 521 are adjusted in such a way that the optical signal 54 is condensed to a position shifted from the center of the light receiving surface of the detector 524 in a negative direction of the x-axis (upward direction of the page). Positions of the light source 512 and the condensers 515 and 522 are adjusted in such a way that the optical signal 55 is condensed to a position shifted from the center of the light receiving surface of the detector 525 in a positive direction of the x-axis (downward direction of the page). Positions of the light source 513 and the condensers 516 and 523 are adjusted in such a way that the optical signal 56 is condensed to the center of the light receiving surface of the detector 526. Further, the spread angle of the optical signal 56 is greater than the spread angle of the optical signals 54 and 55.

Operation in Second Example Embodiment

The optical signal 54 with the wavelength $\lambda_4$ output from the light source 511, a drive current and a temperature of which are controlled by the driver 517, is converted into a subparallel light beam by the condenser 514, propagates through the air, and is received by the receiver 52. The optical signal 54 is condensed by the condenser 521 and photoelectrically converted by the detector 524. The signal processing unit 527 calculates an average value of a concentration of nitrogen dioxide ($NO_2$) between the transmitter 51 and the receiver 52 by processing the electric signal acquired herein.

The optical signal 55 with the wavelength $\lambda_5$ output from the light source 512, a drive current and a temperature of which are controlled by the driver 518, is converted into a subparallel light beam by the condenser 515, propagates through the air, and is received by the receiver 52. The optical signal 55 is condensed by the condenser 522 and photoelectrically converted by the detector 525. The signal processing unit 527 calculates an average value of a concentration of carbon dioxide ($CO_2$) between the transmitter 51 and the receiver 52 by processing the electric signal acquired herein.

The optical signal 56 with the wavelength $\lambda_6$ output from the light source 513, a drive current and a temperature of which are controlled by the driver 519, is converted into a subparallel light beam by the condenser 516, propagates through the air, and is received by the receiver 52. The optical signal 56 is condensed by the condenser 523 and photoelectrically converted by the detector 526. The signal processing unit 527 calculates an average value of a concentration of carbon monoxide (CO) between the transmitter 51 and the receiver 52 by processing the electric signal acquired herein.

Figure 8:
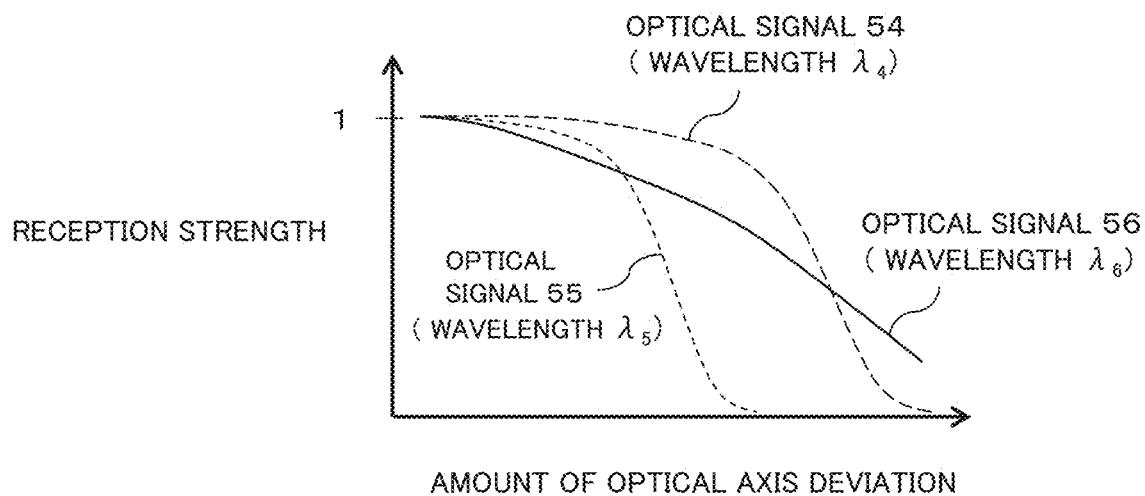
FIG. 8 is a schematic diagram illustrating a first example of a change in reception strength of the three optical signals in the second example embodiment.
Figure 9:
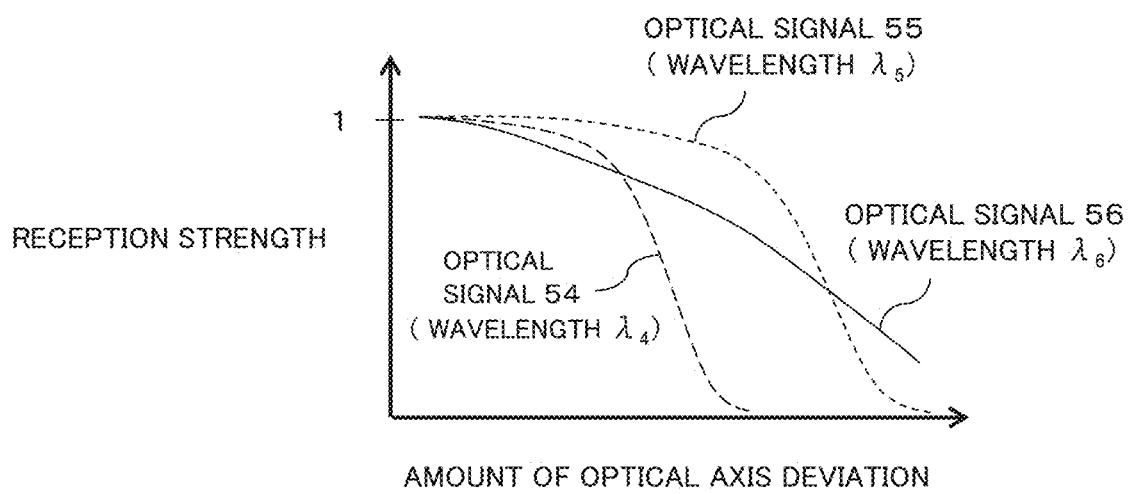
FIG. 9 is a schematic diagram illustrating a second example of a change in reception strength of the three optical signals in the second example embodiment.

FIGS. 8 and 9 are schematic diagrams illustrating first and second examples of a change in reception strength of the optical signals 54 to 56 in the second example embodiment. An operation when an optical axis between the transmitter 51 and the receiver 52 is deviated is described by using FIGS. 8 and 9. FIGS. 8 and 9 illustrate the change in the reception strength of the optical signals 54 to 56 with respect to an amount of optical axis deviation. Further, a difference between FIGS. 8 and 9 is handled when an optical axis deviation occurs in a different direction on the x-axis in FIG. 7.

As illustrated in FIG. 7, the spread angle of the optical signals 54 and 55 is narrower than the spread angle of the optical signal 56. Thus, the reception strength of the optical signal 56 gradually decreases even in a region having a small deviation amount of an optical axis with an increase in the deviation amount of the optical axis. On the other hand, the reception strength of the optical signals 54 and 55 does not greatly change in the region having the small deviation amount of the optical axis.

When the deviation amount of the optical axis increases, the reception strength of one of the optical signals 54 and 55 decreases first while depending on a shift direction of the condensation position on the x-axis of the optical signals 54 and 55 illustrated in FIG. 7, and a characteristic exemplified in FIG. 8 or 9 is acquired. Such a characteristic is acquired under a condition that a size of the light receiving surfaces of the detectors 524 and 525 is greater than a spot size of the optical signals 54 and 55 after condensation in the condensers 521 and 522.

Figure 10:
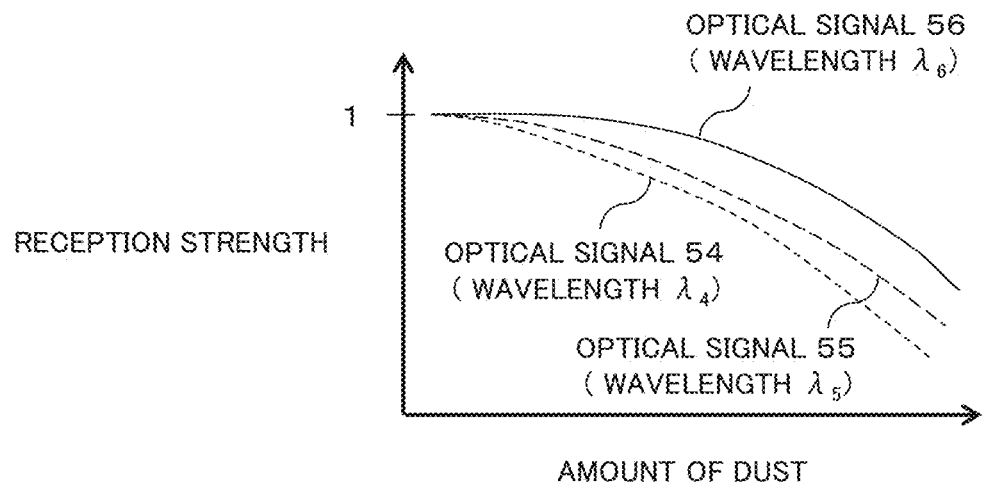
FIG. 10 is a schematic diagram illustrating a third example of a change in reception strength of the three optical signals in the second example embodiment.

An operation when dust present in the space between the transmitter 51 and the receiver 52 increases is described by using FIG. 10. FIG. 10 is a schematic diagram illustrating a third example of a change in the reception strength of the optical signals 54 to 56 in the second example embodiment.

As described in the first example embodiment, when a size of a particle such as dust is smaller than a wavelength of an optical signal, a size of scattering is proportional to an amount n of dust and is inversely proportional to fourth power of a wavelength $\lambda$ of the optical signal. Since $\lambda_4<\lambda_5<\lambda_6$ in the present example embodiment, as illustrated in FIG. 10, the optical signal 55 output from the light source 512 has a greater decrease amount of the reception strength with respect to the amount of dust than that of the optical signal 56 output from the light source 513. Further, the optical signal 54 output from the light source 511 has a greater decrease amount of the reception strength with respect to the amount of dust than that of the optical signal 55 output from the light source 512.

In this way, reception strength changes of the three optical signals 54 to 56 are different in a case of an optical axis deviation between the transmitter 51 and the receiver 52, and in a case of an increase in dust present in the space. Thus, by comparing reception strength of different optical signals in the identifier 528, a factor of decrease in the reception strength can be separated into an optical axis deviation or an increase in dust. In addition, a direction of the optical axis deviation on the x-axis can also be estimated. An example of the procedure is indicated below.

(1) The transmitter 51 transmits the optical signals 54 to 56, and the receiver 52 receives the optical signals 54 to 56 by the detectors 524 to 526.
(2) Let, at a time $t_n$, light intensity detected by the detector 524 be $Q_1(t_n)$, light intensity detected by the detector 525 be $Q_2(t_n)$, and light intensity detected by the detector 526 be $Q_3(t_n)$.
(3) Let, at a time $t_{n+1}$ after the time $t_n$, light intensity detected by the detector 524 be $Q_1(t_{n+1})$, light intensity detected by the detector 525 be $Q_2(t_{n+1})$, and light intensity detected by the detector 526 be $Q_3(t_{n+1})$.
(4) The identifier 528 compares magnitude of changes among $Q_1$, $Q_2$, and $Q_3$ between the time $t_n$ and the time $t_{n+1}$, and determines a state of the gas detecting system 2. A basis of the procedure of determination is similar to that in FIG. 5 in the first example embodiment. However, in order to determine a direction of an optical axis deviation, the procedure for comparing changes between the light intensities $Q_1$ and $Q_3$ when receiving the optical signals 54 and 55 is newly added.
(5) When a decrease amount of $Q_3$ is less than or equal to a predetermined threshold value $Q_{3th}$ and decrease amounts of $Q_1$ and $Q_2$ are also less than or equal to a predetermined threshold value $Q_{12th}$, it is determined that there is no abnormality.
(6) When the decrease amount of $Q_3$ is less than or equal to the predetermined threshold value $Q_{3th}$ and the decrease amounts of $Q_1$ and $Q_2$ exceed the predetermined threshold value $Q_{12th}$, the reception strength of only the optical signals 54 and 55 with a short wavelength decreases, and thus it is determined that the reception strength decreases due to dust.
(7) When the decrease amounts of $Q_2$ and $Q_3$ exceed the predetermined threshold values $Q_{12th}$ and $Q_{3th}$, respectively, and only the decrease amount of $Q_1$ is less than or equal to the predetermined threshold value $Q_{12th}$, it is determined that there is an optical axis deviation in the positive direction of the x-axis. The reason is that the optical signal 54 is offset in the negative direction of the x-axis at first and is received in the detector 524, and thus the light intensity $Q_1$ does not greatly decrease during light reception at an early stage, with respect to an optical axis deviation toward the positive direction of the x-axis.
(8) On the other hand, when the decrease amounts of $Q_1$ and $Q_3$ respectively exceed the predetermined threshold values $Q_{12th}$ and $Q_{3th}$ and only the decrease amount of $Q_2$ is less than or equal to the predetermined threshold value $Q_{12th}$, it is determined that there is an optical axis deviation in the negative direction of the x-axis. The reason is that the optical signal 55 is offset in the positive direction of the x-axis and is received in the detector 525, and thus the light intensity $Q_2$ does not decrease during light reception at an early stage, with respect to an optical axis deviation toward the negative direction of the x-axis.

In a case other than (1) to (4) above, for example, when all of the decrease amounts of $Q_1$ to $Q_3$ exceed a predetermined threshold value, it may be determined that there is an abnormality. Further, when the decrease amounts of $Q_1$ and $Q_2$ each exceed the predetermined threshold value $Q_{12th}$ and only the decrease amount of $Q_3$ is less than or equal to the predetermined threshold value $Q_{3th}$, it may be determined that there is an optical axis deviation in a direction that is not parallel to the x-axis. The reason for this is as follows. The optical signals 54 and 55 are received by a portion other than the center of the detectors 524 and 525 even during a normal operation. Thus, for example, even a relatively small optical axis deviation to a direction perpendicular to the x-axis may cause both of the optical signals 54 and 55 incident on the detectors 524 and 525 to be deviated from a light receiving range of the detectors 524 and 525.

Effect of Second Example Embodiment

A first effect of the gas detecting system 2 in the second example embodiment can distinguish causes for a decrease in received optical signal strength into a decrease due to an optical axis deviation and a decrease due to an influence of dust and the like. The reason for this is that a change in the received optical signal strength is acquired by using optical signals with different wavelengths and spread angles.

Then, the gas detecting system 1 in the present example embodiment can achieve long-term stable operation. The reason for this is that treatment according to a cause can be achieved by distinguishing causes for a decrease in received optical signal strength into a decrease due to an optical axis deviation and a decrease due to an influence of dust and the like.

A second effect of the gas detecting system 2 in the second example embodiment facilitates a readjustment of an optical axis deviation. Since a direction of an optical axis deviation cannot be determined in the first example embodiment, a direction of an optical axis adjustment requires trial and error, and time may be needed for the optical axis adjustment. However, in the present example embodiment, information related to a direction of an optical axis deviation can be acquired by using the three optical signals 54 to 56, and a readjustment of an optical axis can be facilitated.

Modification Example of Second Example Embodiment

An optical amplifier may be inserted in an output stage of the light sources 511 to 513 and an input stage of the detectors 524 to 526. By using the optical amplifier, it is possible to improve a signal-to-noise ratio of the optical signals 54 to 56 to be received, and to increase accuracy of a detection result of gas.

When the optical signals 54 to 56 spatially propagate from the transmitter 51 to the receiver 52, a spatial propagation path may be lengthened by reflecting the optical signals for more than once by using one or more mirrors. A gas having a lower concentration can be detected by lengthening the propagation path.

Optical axis deviations in a plurality of axis directions can be detected by shifting a condensation position of a light source in a direction different from the x-axis in FIG. 7 by using four or more optical signals. With such a configuration, a readjustment of an optical axis can be facilitated further.

The present example embodiment provides the example in which detection of carbon monoxide, carbon dioxide, and nitrogen dioxide is performed. However, a configuration in which an absorption spectrum of still another gas molecule is monitored at a different wavelength may be provided. The present example embodiment is also generally applicable to a system for detecting a plurality of gas molecules by using optical signals with a plurality of wavelengths.

Further, the present example embodiment indicates the example in which an optical signal spatially propagates between the transmitter 51 and the receiver 52. However, it is also possible to have a configuration in which the reflective plate 82 is used and the transmitter and the receiver are integrated together, similarly to the modification example of the first example embodiment described with FIG. 11. Applying this configuration in FIG. 11 to the second example embodiment allows to reduce an influence of an optical axis deviation and to simplify an optical axis readjustment, and also enables to set one end of a propagation path of an optical signal to non-power supply.

Third Example Embodiment

The effect of the gas detecting system described in the first example embodiment is also acquired in the following detecting system. Description is given while the reference sign used in the first example embodiment is cited in parentheses.

The detecting system includes a transmitter (11) and a receiver (12). The transmitter (11) includes a light emitting means (111, 112) for transmitting a first optical signal (23) and a second optical signal (24) having wavelengths and spread angles different from each other.

The receiver (12) includes a detecting means (123, 124) and an identification means (126). The detecting means (123, 124) receives the first optical signal and the second optical signal, and outputs a first reception signal indicating reception strength of the first optical signal and a second reception signal indicating reception strength of the second optical signal. The identification means (126) determines a propagation state of the first optical signal and the second optical signal, based on an amount of change in the first reception signal and the second reception signal.

The detecting system including such configuration distinguishes between a decrease in received optical signal strength due to an optical axis deviation and a decrease in received optical signal strength due to an influence of dust and the like by detecting an amount of change in a plurality of reception signals.

As stated above, the invention of the present application has been described with reference to the example embodiments; however, the invention of the present application is not limited to the above-described example embodiments. Various modifications that can be understood by those skilled in the art within the scope of the invention of the present application may be applied to the configuration and the details of the invention of the present application.

Further, the configuration described in each of the example embodiments is not necessarily exclusive from each other. The action and the effects of the present invention may be achieved by a configuration combining the whole or a part of the above-described example embodiments.

The function and the procedure described in each of the example embodiments above may be achieved by a program executed by a central processing unit (CPU) included in the receiver 12 or 52. The program is recorded in a tangible and non-transitory recording medium. A semiconductor memory or a fixed magnetic disk device is used as the recording medium, which is not limited thereto. The CPU is a computer included in, for example, the receiver 12 or 52, but the signal processing unit 125 or 527 may include the function of the CPU.

The example embodiments disclosed above can be described as, but not limited to, the following supplementary notes.

(Supplementary Note 1)

A detecting system, comprising:

a transmitter that includes light emitting means for transmitting a first optical signal and a second optical signal having wavelengths and spread angles different from each other; and a receiver that includes detecting means for receiving the first optical signal and the second optical signal, and outputting a first reception signal indicating reception strength of the first optical signal and a second reception signal indicating reception strength of the second optical signal, and identification means for determining a propagation state of the first optical signal and the second optical signal, based on an amount of change in the first reception signal and the second reception signal.

(Supplementary Note 2)

The detecting system according to supplementary note 1, wherein a wavelength of the first optical signal is shorter than a wavelength of the second optical signal, and a spread angle of the first optical signal is smaller than a spread angle of the second optical signal.

(Supplementary Note 3)

The detecting system according to supplementary note 2, wherein the identification means determines that permeability of a surrounding atmosphere decreases when reception strength of the first optical signal decreases by exceeding a first threshold value, and reception strength of the second optical signal does not decrease by exceeding a second threshold value, and determines that an optical axis deviation occurs between the transmitter and the receiver when reception strength of the second optical signal decreases by exceeding the second threshold value, and reception strength of the first optical signal does not decrease by exceeding the first threshold value.

(Supplementary Note 4)

The detecting system according to supplementary note 2 or 3, wherein:

the detecting means includes first detecting means for receiving the first optical signal and outputting the first reception signal, and second detecting means for receiving the second optical signal and outputting the second reception signal;

an optical axis of the first detecting means is shifted with respect to an optical axis of the first optical signal; and the identification means detects a direction of an optical axis deviation between the transmitter and the receiver, based on an amount of change in the first reception signal and the second reception signal.

(Supplementary Note 5)

The detecting system according to supplementary note 2 or 3, wherein the first optical signal includes a third optical signal and a fourth optical signal, wavelengths of the third optical signal and the fourth optical signal are shorter than a wavelength of the second optical signal, spread angles of the third optical signal and the fourth optical signal are smaller than a spread angle of the second optical signal, the detecting means further receives the third optical signal and the fourth optical signal, and outputs a third reception signal indicating reception strength of the third optical signal and a fourth reception signal indicating reception strength of the fourth optical signal, and the identification means determines a propagation state of the second optical signal to the fourth optical signal, based on magnitude of the second reception signal to the fourth reception signal.

(Supplementary Note 6)

The detecting system according to supplementary note 5, wherein:

the detecting means includes second detecting means for receiving the second optical signal and outputting the second reception signal, third detecting means for receiving the third optical signal and outputting the third reception signal, and fourth detecting means for receiving the fourth optical signal and outputting the fourth reception signal;

an optical axis of the third detecting means is shifted in a first direction with respect to an optical axis of the third optical signal;

an optical axis of the fourth detecting means is shifted in a direction opposite to the first direction with respect to an optical axis of the fourth optical signal; and the identification means detects a direction of an optical axis deviation between the transmitter and the receiver, based on an amount of change in the second reception signal to the fourth reception signal.

(Supplementary Note 7)

The detecting system according to any one of supplementary notes 1 to 6, further comprising a reflector that reflects the first optical signal and the second optical signal.

(Supplementary Note 8)

The detecting system according to any one of supplementary notes 1 to 7, wherein the transmitter and the receiver are formed integrally.

(Supplementary Note 9)

The detecting system according to any one of supplementary notes 1 to 8, wherein the receiver further includes signal processing means for calculating a gas concentration between the transmitter and the receiver, based on the first reception signal and the second reception signal.

(Supplementary Note 10)

A detecting method, comprising:

transmitting a first optical signal and a second optical signal having wavelengths and spread angles different from each other;

receiving the first optical signal and the second optical signal;

outputting a first reception signal indicating reception strength of the first optical signal and a second reception signal indicating reception strength of the second optical signal; and determining a propagation state of the first optical signal and the second optical signal, based on an amount of change in the first reception signal and the second reception signal.

(Supplementary Note 11)

The detecting method according to supplementary note 10, wherein a wavelength of the first optical signal is shorter than a wavelength of the second optical signal, and a spread angle of the first optical signal is smaller than a spread angle of the second optical signal.

(Supplementary Note 12)

The detecting method according to supplementary note 11, further comprising:

determining that permeability of a surrounding atmosphere decreases when reception strength of the first optical signal decreases by exceeding a first threshold value, and reception strength of the second optical signal does not decrease by exceeding a second threshold value; and determining that an optical axis deviation of the first optical signal and the second optical signal occurs when reception strength of the second optical signal decreases by exceeding the second threshold value, and reception strength of the first optical signal does not decrease by exceeding the first threshold value.

(Supplementary Note 13)

The detecting method according to supplementary note 11 or 12, further comprising:

receiving the first optical signal and outputting the first reception signal; and receiving the second optical signal and outputting the second reception signal, wherein an optical axis of first detecting means for receiving the first optical signal is caused to change a position with respect to an optical axis of the first optical signal, and a direction of an optical axis deviation of the first optical signal and the second optical signal is detected based on an amount of change in the first reception signal and the second reception signal.

(Supplementary Note 14)

The detecting method according to supplementary note 11 or 12, wherein the first optical signal includes a third optical signal and a fourth optical signal, wavelengths of the third optical signal and the fourth optical signal are shorter than a wavelength of the second optical signal, spread angles of the third optical signal and the fourth optical signal are smaller than a spread angle of the second optical signal, and the detecting method further comprises receiving the third optical signal and the fourth optical signal, outputting a third reception signal indicating reception strength of the third optical signal and a fourth reception signal indicating reception strength of the fourth optical signal, and determining a propagation state of the second optical signal to the fourth optical signal, based on magnitude of the second reception signal to the fourth reception signal.

(Supplementary Note 15)

The detecting method according to supplementary note 14, further comprising:

receiving the second optical signal, and outputting the second reception signal;

receiving the third optical signal, and outputting the third reception signal;

receiving the fourth optical signal, and outputting the fourth reception signal;

shifting an optical axis of third detecting means for receiving the third optical signal in a first direction with respect to an optical axis of the third optical signal;

shifting an optical axis of fourth detecting means for receiving the fourth optical signal in a direction opposite to the first direction with respect to an optical axis of the fourth optical signal; and detecting a direction of an optical axis deviation of the second optical signal to the fourth optical signal, based on an amount of change in the second reception signal to the fourth reception signal.

(Supplementary Note 16)

The detecting method according to supplementary note 14 or 15, further comprising signal processing means for calculating a gas concentration on a propagation path of the second optical signal to the fourth optical signal, based on the first reception signal and the second reception signal.

(Supplementary Note 17)

A receiver, comprising:

detecting means for receiving a first optical signal and a second optical signal having wavelengths and spread angles different from each other, and outputting a first reception signal indicating reception strength of the first optical signal and a second reception signal indicating reception strength of the second optical signal; and identification means for determining a propagation state of the first optical signal and the second optical signal, based on an amount of change in the first reception signal and the second reception signal.

(Supplementary Note 18)

A method of controlling a receiver, the method comprising:

receiving a first optical signal and a second optical signal having wavelengths and spread angles different from each other;

outputting a first reception signal indicating reception strength of the first optical signal and a second reception signal indicating reception strength of the second optical signal; and determining a propagation state of the first optical signal and the second optical signal, based on an amount of change in the first reception signal and the second reception signal.

(Supplementary Note 19)

A control program of a receiver for causing a computer of the receiver to execute:

a procedure for receiving a first optical signal and a second optical signal having wavelengths and spread angles different from each other;

a procedure for outputting a first reception signal indicating reception strength of the first optical signal and a second reception signal indicating reception strength of the second optical signal; and a procedure for determining a propagation state of the first optical signal and the second optical signal, based on an amount of change in the first reception signal and the second reception signal.

This application is based upon and claims the benefit of priority from Japanese patent application No. 2017-012455, filed on Jan. 26, 2017, the disclosure of which is incorporated herein in its entirety by reference.

INDUSTRIAL APPLICABILITY

The present invention is applicable to a gas detecting system and a gas concentration measuring system. In particular, the present invention is also applicable to a system for measuring gas concentration information in a wide area.

REFERENCE SIGNS LIST 1, 2 Gas detecting system
11, 51, 91, 101 Transmitter
12, 52, 92 Receiver
23, 24, 54 to 56 Optical signal
81 Transmitter-receiver
82 Reflective plate
102, 106, 123, 124, 524 to 526 Detector
103 Mirror
104 Half mirror
105, 126, 528 Identifier
108 Amplifier
111, 112, 511 to 513 Light source
113, 114, 121, 122, 514 to 516, 521 to 523 Condenser
115 Optical axis controller
116, 117, 517 to 519 Driver
123 Detector
125, 527, 925 Signal processing unit
126 Identifier
127 Optical axis controller
911, 912 Light source
913, 914, 921, 922 Condenser
916, 917 Driver
923, 924 Detector

What is claimed is:

1. A detecting system, comprising:

a transmitter that includes a light emitter configured to transmit a first optical signal and a second optical signal having wavelengths and spread angles different from each other; and a receiver that includes a detector configured to receive the first optical signal and the second optical signal, and output a first reception signal indicating reception strength of the first optical signal and a second reception signal indicating reception strength of the second optical signal, and an identifier configured to determine a propagation state of the first optical signal and the second optical signal, based on an amount of change in the first reception signal and the second reception signal, wherein a wavelength of the first optical signal is shorter than a wavelength of the second optical signal, and a spread angle of the first optical signal is smaller than a spread angle of the second optical signal, and the identifier determines that permeability of a surrounding atmosphere decreases when reception strength of the first optical signal decreases by exceeding a first threshold value, and reception strength of the second optical signal does not decrease by exceeding a second threshold value, and determines that an optical axis deviation occurs between the transmitter and the receiver when reception strength of the second optical signal decreases by exceeding the second threshold value, and reception strength of the first optical signal does not decrease by exceeding the first threshold value.

2. The detecting system according to claim 1, wherein the first optical signal includes a third optical signal and a fourth optical signal, wavelengths of the third optical signal and the fourth optical signal are shorter than a wavelength of the second optical signal, spread angles of the third optical signal and the fourth optical signal are smaller than a spread angle of the second optical signal, the detector further receives the third optical signal and the fourth optical signal, and outputs a third reception signal indicating reception strength of the third optical signal and a fourth reception signal indicating reception strength of the fourth optical signal, and the identifier determines a propagation state of the second optical signal to the fourth optical signal, based on magnitude of the second reception signal to the fourth reception signal.

3. The detecting system according to claim 2, wherein: the detector includes
 a second detector configured to receive the second optical signal and output the second reception signal,
 a third detector configured to receive the third optical signal and output the third reception signal, and
 a fourth detector configured to receive the fourth optical signal and output the fourth reception signal;
an optical axis of the third detector is shifted in a first direction with respect to an optical axis of the third optical signal;
an optical axis of the fourth detector is shifted in a direction opposite to the first direction with respect to an optical axis of the fourth optical signal; and
the identifier detects a direction of an optical axis deviation between the transmitter and the receiver, based on an amount of change in the second reception signal to the fourth reception signal.

4. The detecting system according to claim 1, wherein: the detector includes
 a first detector configured to detect the first optical signal and output the first reception signal, and
 a second detector configured to detect the second optical signal and output the second reception signal;
an optical axis of the first detector is shifted with respect to an optical axis of the first optical signal; and
the identifier detects a direction of an optical axis deviation between the transmitter and the receiver, based on an amount of change in the first reception signal and the second reception signal.

5. The detecting system according to claim 1, further comprising
a reflector that reflects the first optical signal and the second optical signal.

6. The detecting system according to claim 1, wherein the transmitter and the receiver are formed integrally.

7. The detecting system according to claim 1, wherein the receiver further includes a signal processor configured to calculate a gas concentration between the transmitter and the receiver, based on the first reception signal and the second reception signal.

8. A detecting system, comprising:
a transmitter that includes a light emitter configured to transmit a first optical signal and a second optical signal having wavelengths and spread angles different from each other; and
a receiver that includes a detector configured to receive the first optical signal and the second optical signal, and output a first reception signal indicating reception strength of the first optical signal and a second reception signal indicating reception strength of the second optical signal, and an identifier configured to determine a propagation state of the first optical signal and the second optical signal, based on an amount of change in the first reception signal and the second reception signal, wherein a wavelength of the first optical signal is shorter than a wavelength of the second optical signal, and a spread angle of the first optical signal is smaller than a spread angle of the second optical signal, and the detector includes
 a first detector configured to detect the first optical signal and output the first reception signal, and
 a second detector configured to detect the second optical signal and output the second reception signal;
an optical axis of the first detector is shifted with respect to an optical axis of the first optical signal; and
the identifier detects a direction of an optical axis deviation between the transmitter and the receiver, based on an amount of change in the first reception signal and the second reception signal.

9. The detecting system according to claim 8, wherein the first optical signal includes a third optical signal and a fourth optical signal, wavelengths of the third optical signal and the fourth optical signal are shorter than a wavelength of the second optical signal, spread angles of the third optical signal and the fourth optical signal are smaller than a spread angle of the second optical signal, the detector further receives the third optical signal and the fourth optical signal, and outputs a third reception signal indicating reception strength of the third optical signal and a fourth reception signal indicating reception strength of the fourth optical signal, and the identifier determines a propagation state of the second optical signal to the fourth optical signal, based on magnitude of the second reception signal to the fourth reception signal.

10. The detecting system according to claim 9, wherein: the detector includes
 a second detector configured to receive the second optical signal and output the second reception signal,
 a third detector configured to receive the third optical signal and output the third reception signal, and
 a fourth detector configured to receive the fourth optical signal and output the fourth reception signal;
an optical axis of the third detector is shifted in a first direction with respect to an optical axis of the third optical signal;
an optical axis of the fourth detector is shifted in a direction opposite to the first direction with respect to an optical axis of the fourth optical signal; and
the identifier detects a direction of an optical axis deviation between the transmitter and the receiver, based on an amount of change in the second reception signal to the fourth reception signal.

11. The detecting system according to claim 8, further comprising
a reflector that reflects the first optical signal and the second optical signal.

12. The detecting system according to claim 8, wherein the transmitter and the receiver are formed integrally.

13. The detecting system according to claim 8, wherein the receiver further includes a signal processor configured to calculate a gas concentration between the transmitter and the receiver, based on the first reception signal and the second reception signal.

14. A detecting method comprising:
transmitting, by an emitter of a transmitter, a first optical signal and a second optical signal having wavelengths and spread angles different from each other;
receiving, by a detector of a receiver, the first optical signal and the second optical signal, and outputting a first reception signal indicating reception strength of the first optical signal and a second reception signal indicating reception strength of the second optical signal; and
determining, by an identifier of the receiver, a propagation state of the first optical signal and the second optical signal, based on an amount of change in the first reception signal and the second reception signal;
determining, by the identifier of the receiver, that permeability of a surrounding atmosphere decreases when reception strength of the first optical signal decreases by exceeding a first threshold value, and reception strength of the second optical signal does not decrease by exceeding a second threshold value; and
determining, by the identifier of the receiver, determines that an optical axis deviation occurs between the transmitter and the receiver when reception strength of the second optical signal decreases by exceeding the second threshold value, and reception strength of the first optical signal does not decrease by exceeding the first threshold value,
wherein a wavelength of the first optical signal is shorter than a wavelength of the second optical signal, and a spread angle of the first optical signal is smaller than a spread angle of the second optical signal.

* * * * *